(12) United States Patent
Biller et al.

(10) Patent No.: US 9,378,426 B2
(45) Date of Patent: *Jun. 28, 2016

(54) SYSTEMS AND METHODS FOR NOTE RECOGNITION

(71) Applicant: 3M INNOVATIVE PROPERTIES COMPANY, St. Paul, MN (US)

(72) Inventors: Gabriel A. Biller, Seattle, WA (US); Kristopher W. Clover, Minnetonka, MN (US); Masuma W. Henry, Seattle, WA (US); Stephen M. June, Woodbury, MN (US); Brian L. Linzie, Stillwater, MN (US); Robert D. Lorentz, North Oaks, MN (US); David M. Mahli, Woodbury, MN (US); Richard J. Moore, Maplewood, MN (US); Cristin E. Moran, St. Paul, MN (US); Tasuku Nakayama, Kanagawa (JP); Scott D. Pearson, Atlanta, GA (US); Dennard J. Powell, St. Paul, MN (US); Olen Ronning, Seattle, WA (US); Guruprasad Somasundaram, Minneapolis, MN (US); Brian J. Stankiewicz, Mahtomedi, MN (US); Diane R. Wolk, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,358

(22) Filed: May 28, 2015

(65) Prior Publication Data

US 2015/0262023 A1   Sep. 17, 2015

Related U.S. Application Data

(63) Continuation of application No. 14/231,072, filed on Mar. 31, 2014, now Pat. No. 9,070,036.

(60) Provisional application No. 61/807,516, filed on Apr. 2, 2013.

(51) Int. Cl.
*G06K 9/00* (2006.01)
*G06K 9/18* (2006.01)
(Continued)

(52) U.S. Cl.
CPC .............. *G06K 9/18* (2013.01); *G06K 9/00442* (2013.01); *G06K 9/2063* (2013.01); *G06K 9/3258* (2013.01)

(58) Field of Classification Search
CPC . G06K 9/00; G06K 9/00442; G06K 9/00402; G06K 9/20; G06K 9/18
USPC ........................................................ 382/103
See application file for complete search history.

(56) References Cited

U.S. PATENT DOCUMENTS 5,319,745 A * 6/1994 Vinsonneau ............. G06K 9/00
                                                707/E17.009
5,465,165 A   11/1995 Tanio
(Continued)

FOREIGN PATENT DOCUMENTS

EP       1182861        2/2002
JP       2008-010980    1/2008
(Continued)

OTHER PUBLICATIONS

Scott R. Klemmer, Mark W. Newman, Ryan Farrell, Mark Bilezikjian, James A. Landay, "The Designers Outpost: A Tangible Interface for Collaborative web Site Design", CHI 2001.*
(Continued)

*Primary Examiner* — Stephen R Koziol
*Assistant Examiner* — Shaghayegh Azima
(74) *Attorney, Agent, or Firm* — X. Christina Huang

(57) ABSTRACT

At least some aspects of the present disclosure feature systems and methods for note recognition. The note recognition system includes a sensor, a note recognition module, and a note extraction module. The sensor is configured to capture a visual representation of a scene having one or more notes. The note recognition module is coupled to the sensor. The note recognition module is configured to receive the captured visual representation and determine a general boundary of a note from the captured visual representation. The note extraction module is configured to extract content of the note from the captured visual representation based on the determined general boundary of the note.

16 Claims, 10 Drawing Sheets

(51) Int. Cl.
*G06K 9/20* (2006.01)
*G06K 9/32* (2006.01)

(56) References Cited

U.S. PATENT DOCUMENTS

| | | | |
|---|---|---|---|
| 5,898,434 A | 4/1999 | Small | |
| 6,351,559 B1* | 2/2002 | Zhou | G06K 9/2054 |
| | | | 382/175 |
| 6,721,733 B2 | 4/2004 | Lipson | |
| 7,072,512 B2 | 7/2006 | Mehrotra | |
| 7,343,415 B2 | 3/2008 | Kenner | |
| 7,561,310 B2 | 7/2009 | Joyce | |
| 7,573,598 B2 | 8/2009 | Cragun | |
| 7,774,479 B2 | 8/2010 | Kenner | |
| 7,837,094 B2 | 11/2010 | Rhoads | |
| 8,069,173 B2 | 11/2011 | Munekuni | |
| 8,113,432 B2 | 2/2012 | Kimura | |
| 8,139,852 B2 | 3/2012 | Shinjo | |
| 8,238,666 B2 | 8/2012 | Besley | |
| 8,256,665 B2 | 9/2012 | Rhoads | |
| 8,380,040 B2 | 2/2013 | Carter | |
| 8,416,466 B2* | 4/2013 | Takata | H04N 1/00355 |
| | | | 101/226 |
| 8,429,174 B2 | 4/2013 | Ramani | |
| 8,457,449 B2 | 6/2013 | Rhoads | |
| 8,503,791 B2 | 8/2013 | Conwell | |
| 8,542,889 B2* | 9/2013 | Sarnoff | G06K 9/00154 |
| | | | 382/119 |
| 8,543,926 B2 | 9/2013 | Giles | |
| 8,558,913 B2 | 10/2013 | Pillman | |
| 8,600,167 B2 | 12/2013 | Showering | |
| 8,655,068 B1 | 2/2014 | Li | |
| 2004/0017400 A1 | 1/2004 | Ly | |
| 2004/0193697 A1* | 9/2004 | Grosvenor | G06K 9/2063 |
| | | | 709/217 |
| 2005/0091578 A1 | 4/2005 | Madan | |
| 2006/0039045 A1* | 2/2006 | Sato | G06K 9/00469 |
| | | | 358/538 |
| 2006/0077468 A1 | 4/2006 | Loce | |
| 2006/0221357 A1 | 10/2006 | Uzawa | |
| 2007/0089049 A1* | 4/2007 | Gormish | G06F 17/24 |
| | | | 715/224 |
| 2007/0110277 A1* | 5/2007 | Hayduchok | B07C 3/00 |
| | | | 382/101 |
| 2007/0176780 A1* | 8/2007 | Hart | G06F 3/01 |
| | | | 340/572.1 |
| 2008/0021701 A1 | 1/2008 | Bobick | |
| 2008/0075364 A1 | 3/2008 | Speigle | |
| 2010/0023878 A1 | 1/2010 | Douris | |
| 2010/0096452 A1 | 4/2010 | Habraken | |
| 2010/0191772 A1 | 7/2010 | Brown | |
| 2010/0202680 A1* | 8/2010 | Hamasaki | G06K 9/00 |
| | | | 382/137 |
| 2011/0066658 A1* | 3/2011 | Rhoads | G06F 3/017 |
| | | | 707/803 |
| 2011/0164815 A1 | 7/2011 | Sharma | |
| 2011/0187731 A1 | 8/2011 | Tsuchida | |
| 2011/0285123 A1 | 11/2011 | Wittke | |
| 2012/0014456 A1 | 1/2012 | Martinez Bauza | |
| 2012/0151577 A1* | 6/2012 | King | G06F 17/30619 |
| | | | 726/21 |
| 2012/0320410 A1* | 12/2012 | Kakegawa | G06F 3/1219 |
| | | | 358/1.15 |
| 2012/0324372 A1* | 12/2012 | Kowalkiewicz | G06Q 10/101 |
| | | | 715/753 |
| 2013/0054636 A1* | 2/2013 | Tang | G06F 17/241 |
| | | | 707/769 |
| 2013/0163047 A1* | 6/2013 | Miyamoto | G06F 3/1296 |
| | | | 358/1.15 |
| 2013/0217440 A1 | 8/2013 | Lord | |
| 2013/0227476 A1 | 8/2013 | Frey | |
| 2013/0258117 A1 | 10/2013 | Penov | |
| 2013/0258122 A1 | 10/2013 | Keane | |
| 2013/0271784 A1* | 10/2013 | Nakajima | H04N 1/00411 |
| | | | 358/1.15 |
| 2014/0024411 A1* | 1/2014 | Rao | H04W 88/06 |
| | | | 455/553.1 |
| 2014/0056512 A1 | 2/2014 | Lerios | |

FOREIGN PATENT DOCUMENTS

| | | |
|---|---|---|
| JP | 2009-020813 | 1/2009 |
| JP | 2010-244210 | 10/2010 |
| JP | 2011-090486 | 5/2011 |
| JP | 2011-097318 | 5/2011 |
| WO | WO 2012-070935 | 5/2012 |
| WO | WO 2013-085512 | 6/2013 |
| WO | WO 2013-184767 | 12/2013 |

OTHER PUBLICATIONS

Katherine M. Everitt, Scott R. Klemmer, Robert Lee, James A. Landay, "Two Worlds Apart: Bridging the Gap Between Physicaland Virtual Media for Distributed Design Collaboration", CHI 2003, Apr. 5-10, 2003.*

Boykov, "Graph Cuts And Efficient N-D Image Segmentation", International Journal of Computer Vision, 2006, vol. 70, No. 2, pp. 109-131.

Davidson, "Calculation Of Color Differences From Visual Sensitivity Ellipsoids", Journal of the Optical Society of America, Dec. 1951, vol. 41, No. 12, pp. 1052-1055.

Everitt, "Two Worlds Apart: Bridging the Gap Between Physical and Virtual Media for Distributed Design Collaboration", CHI 2003, Apr. 5-10, 2003, pp.

Felzenszwalb, "Efficient Graph-Based Image Segmentation", International Journal of Computer Vision, 2004, vol. 59, No. 2, pp. 167-181.

Fisher, "Change Detection In Color Images", Proceedings of 7th IEEE Conference on Computer Vision and Pattern, 1999, 6 pages.

Frome, "Visibility Of Borders: Separate And Combined Effects Of Color Differences, Luminance Contrast, And Luminance Level", J. Opt. Soc. Am., Feb. 1981, vol. 71, No. 2, pp. 145-150.

Geyer, "Experiences from Employing Evernote as a Tool for Documenting Collaborative Design Processes", Jun. 12, 2012, 2 pages.

Gur, "Isoluminant Stimuli May Not Expose The Full Contribution Of Color To Visual Functioning: Spatial Contrast Sensitivity Measurements Indicate Interaction Between Color And Luminance Processing", Vision Research, Jul. 7, 1992, vol. 32, No. 7, pp. 1253-1262.

Hsieh, "Peripheral Display of Digital handwritten notes", CHI Proceedings of the SIGCHI Conference on Human Factors in Computing Systems, Apr. 22-27, 2006, pp. 285-288.

"King jim Shot Note", [Online], [retrieved from internet on Sep. 17, 2014], URL :< http://www.kingjim.co.jp/english/products/shotnote/>, 2 pages.

K-SVD, "An Algorithm for Designing Overcomplete Dictionaries for Sparse Representation", IEEE Transactions on Signal Processing, Nov. 2006, vol. 54, No. 11, pp. 4311-4322.

Klemmer, "The Designers Outpost: A Tangible Interface for Collaborative web Site Design", CHI 2001, 10 pages.

Masaoka, "Fast And Accurate Model For Optimal Color Computation", Optics Letters, Jun. 15, 2010, vol. 35, No. 12, pp. 2031-2033.

Mika, "Fisher Discriminant Analysis With Kernels", Neural Networks for Signal Processing IX, 1999. Proceedings of the 1999 IEEE Signal Processing Society Workshop In Neural Networks for Signal Processing IX, 1999. Proceedings of the 1999 IEEE Signal Processing Society Workshop, Aug. 1999, pp. 41-48.

Rajala, "Visual Sensitivity To Color-Varying Stimuli"; Human Vision, Visual Processing and Digital Display III, Proc. SPIE. Aug. 27, 1992, vol. 1666, pp. 375-386.

Sharma, "The CIEDE2000 Color-Difference Formula: Implementation Notes, Supplementary Test Data, And Mathematical Observations", Color Research & Application, Feb. 2005, vol. 30, No. 1, pp. 21-30.

(56) References Cited

OTHER PUBLICATIONS

Yang, "Photonic Crystal Changes Color When Exposed To An Explosion", Nanotechnology, SPIE Inetrnational Year of Light 2015, Apr. 25, 2011, [online], [retrieved from internet on Sep. 18, 2014], URL:<http://spie.org/x47872.xml?pf=true&ArticleID=x47872>, 3 pages.

International Search Report for PCT International Application No. PCT/US14/32382 mailed on Jun. 16, 2014, 3 pages.

* cited by examiner

SYSTEMS AND METHODS FOR NOTE RECOGNITION

TECHNICAL FIELD

The present disclosure relates to note capturing, recognition, extraction, and/or management tools and systems.

BACKGROUND

Notes have been broadly used in recording, sharing, and communicating ideas and information. For example, during a collaboration session (e.g., brainstorming session), participants write down ideas on Post-It® notes, whiteboard, or paper, and then share with one another. In addition, people commonly use notes throughout the day to memorialize information or content which the individual does not want to forget. As additional examples, people frequently use notes as reminders of actions or events to take in the future, such as to make a telephone call, revise a document or to fill out a time sheet.

On many situations, people would traditionally write down the appropriate information on paper-based notes, such as Post-It® notes. Paper Post-It® notes are simply removed from a dispenser pad of sticky-back paper Post-It® notes, and are applied to various surfaces such as documents, the tops of desks, telephones, or the like. Information can be written on paper Post-It® notes either before or after the paper Post-It® notes are detached from their dispenser pad or attached to their target surfaces. Paper Post-It® notes can be easily moved from one surface to another, such as between documents or between documents and the tops of desks, they can overlap edges or boundaries of documents, they can be layered, and they can be moved with the objects to which they are attached.

SUMMARY

At least some aspects of the present disclosure feature a method of collecting content of notes, comprising the steps of: capturing, by a sensor, a visual representation of a scene having a plurality of notes; recognizing, by a processing unit, one of the plurality of notes from the visual representation; and extracting, by the processing unit, content of the one of the plurality of notes.

At least some aspects of the present disclosure feature a note recognition system including a sensor, a note recognition module, and a note extraction module. The sensor is configured to capture a visual representation of a scene having a plurality of notes. The note recognition module is coupled to the sensor. The note recognition module is configured to receive the captured visual representation and determine a general boundary of one of the plurality of notes from the captured visual representation. The note extraction module is configured to extract content of the one of the plurality of notes from the captured visual representation based on the determined general boundary of the one of the plurality of notes.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Notes have been broadly used in recording, sharing, and communicating ideas and information. For example, during a collaboration session (e.g., brainstorming session), participants write down ideas on Post-It® notes, whiteboard, paper, and then share with one another. At least some aspects of the present disclosure are directed to systems and methods of capturing multiple notes and extracting content of notes. In some embodiments, at least some of the notes include a mark to facilitate the recognition and extraction of the notes. In some cases, the notes are captured and identified/recognized in one visual representation of a scene. A visual representation of a scene, for example, can be a digital photograph of note(s) and the surrounding environment. Further, at least some aspects of the present disclosure are directed to systems and methods of managing multiple notes, such as storing and retrieving the notes, categorizing and grouping the notes, or the like. In some cases, the note management system can improve the efficiency in capturing and extracting note content from a large number of notes. In addition, the note management system can improve the efficiency in grouping and managing notes.

Notes can include physical notes and digital notes. Physical notes generally refer to objects with a general boundary and recognizable content. Physical notes can include the resulting objects after people write, draw, or enter via other type of inputs on the objects, for example, paper, white board, or other objects accepting the inputs. By way of examples, physical notes can include hand-written Post-It® notes, paper, or film, white-board with drawings, posters, and signs. In some cases, one object can include several notes. For example, several ideas can be written on a piece of poster paper or a white-board. In some implementations, to facilitate the recognition of these notes, marks, such as lines, markers, stickers, can be applied to the edges of the notes. Physical notes can be two-dimensional or three dimensional. Physical notes can have various shapes and sizes. For example, a physical note may be a 3 inches×3 inches note; a physical note may be a 26 inches×39 inches poster; and a physical note may be a triangle metal sign. In some cases, physical notes have known shapes and/or sizes. Digital notes generally refer to digital objects with information and/or ideas. Digital notes can be generated using digital inputs. Digital inputs can include, for example, keyboards, touch screens, digital cameras, digital recording devices, stylus, digital pens, or the like.

In some cases, notes are used in a collaboration space. Collaboration space generally refers to a gathering area allowing more than one person to share ideas and thoughts with each other. The collaboration space can include virtual space allowing a group of persons to share ideas and thoughts remotely, besides the gathering area.

Figure 1A:
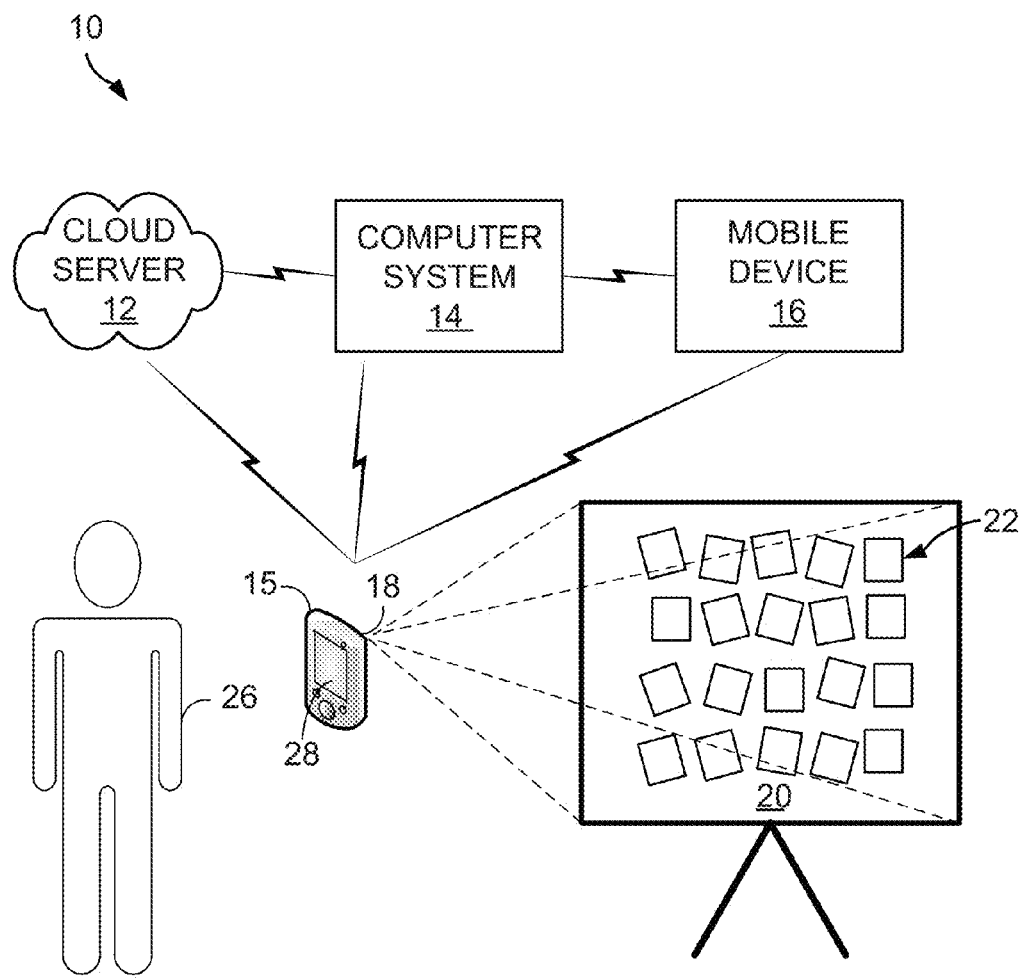
FIG. 1A is a representation illustrating one example of a user capturing an image of a workspace with notes using an image capture device on a mobile device.

FIG. 1A illustrates an example of a note recognition environment 10. In the example of FIG. 1A, environment 10 includes a mobile device 15 to capture and recognize one of more notes 22 from a workspace 20. As described herein, mobile device provides an execution environment for one or more software applications that, as described, can efficiently capture and extract note content from a large number of physical notes, such as the collection of notes 22 from workspace 20. In this example, notes 22 may be the results of a collaborative brainstorming session having multiple participants. As described, mobile device 15 and the software executing thereon may perform a variety of note-related operations, including automated creation of digital notes representative of physical notes 22 of workspace 20.

In the example implementation, mobile device 15 includes, among other components, an image capture device 18 and a presentation device 28. In addition, although not shown in FIG. 1A, mobile device 15 may include one or more processors, microprocessors, internal memory and/or data storage and other electronic circuitry for executing software or firmware to provide the functionality described herein.

In general, image capture device 18 is a camera or other component configured to capture image data representative of workspace 20 and notes 22 positioned therein. In other words, the image data captures a visual representation of an environment, such as workspace 20, having a plurality of visual notes. Although discussed as a camera of mobile device 15, image capture device 18 may comprise other components capable of capturing image data, such as a video recorder, an infrared camera, a CCD (Charge Coupled Device) array, a laser scanner, or the like. Moreover, the captured image data can include at least one of an image, a video, a sequence of images (i.e., multiple images taken within a time period and/or with an order), a collection of images, or the like, and the term input image is used herein to refer to the various example types of image data.

Presentation device 28 may include, but not limited to, an electronically addressable display, such as a liquid crystal display (LCD) or other type of display device for use with mobile device 28. In some implementations, mobile device 15 generates the content to display on presentation device 28 for the notes in a variety of formats, for example, a list, grouped in rows and/or column, a flow diagram, or the like. Mobile device 15 may, in some cases, communicate display information for presentation by other devices, such as a tablet computer, a projector, an electronic billboard or other external device.

As described herein, mobile device 15, and the software executing thereon, provide a platform for creating and manipulating digital notes representative of physical notes 22. For example, in general, mobile device 15 is configured to process image data produced by image capture device 18 to detect and recognize at least one of physical notes 22 positioned within workspace 20. In some examples, the mobile device 15 is configured to recognize note(s) by determining the general boundary of the note(s). After a note is recognized, mobile device 15 extracts the content of at least one of the one or more notes, where the content is the visual information of note 22.

As further described below, mobile device 15 may implement techniques for automated detection and recognition of physical notes 22 and extraction of information, content or other characteristics associated with each of the physical notes.

In the example of FIG. 1A, mobile device 15 is illustrated as a mobile phone. However, in other examples, mobile device 15 may be a tablet computer, a personal digital assistant (PDA), a laptop computer, a media player, an e-book reader, a wearable computing device (e.g., a watch, eyewear, a glove), or any other type of mobile or non-mobile computing device suitable for performing the techniques described herein.

Figure 1B:
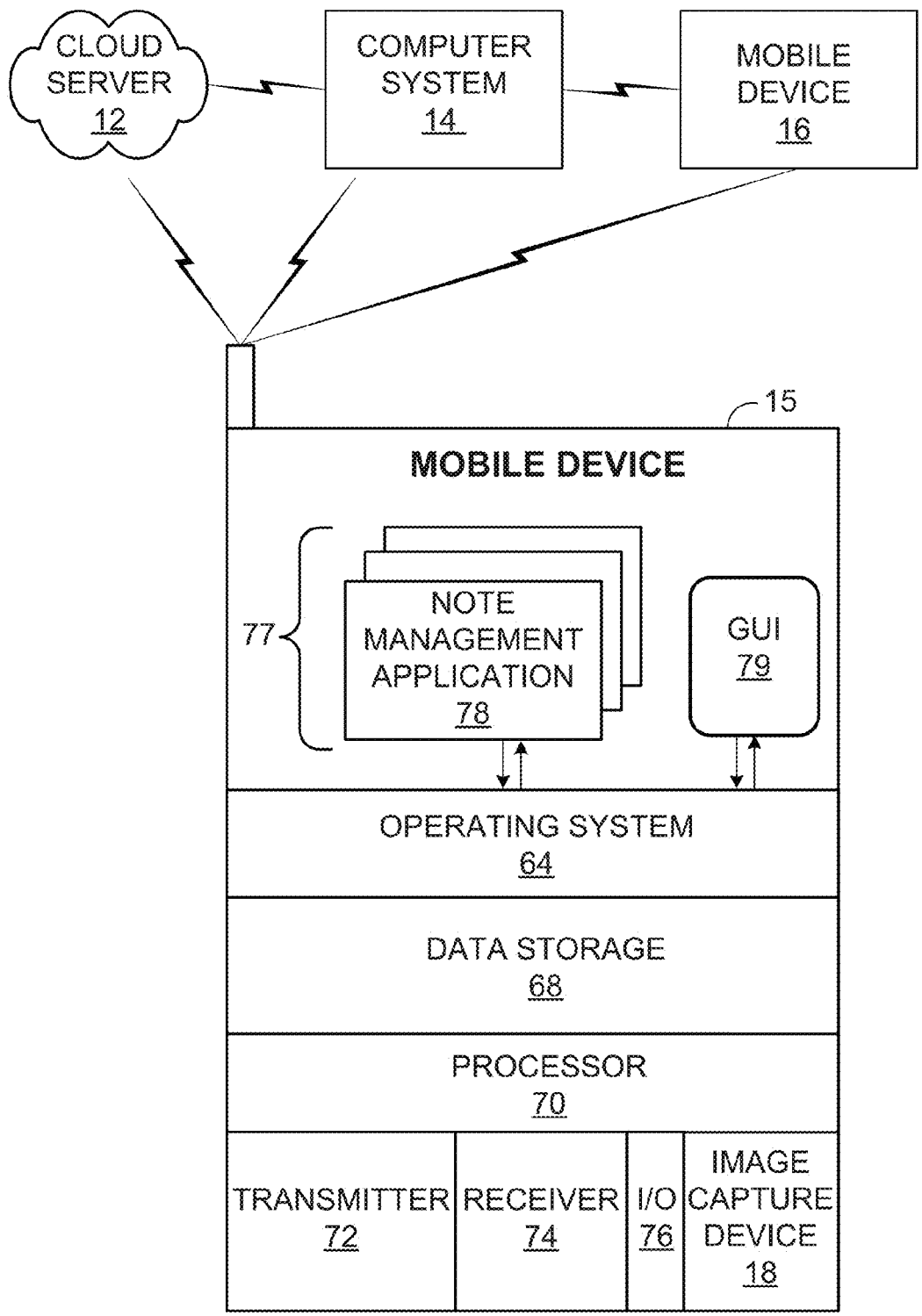
FIG. 1B is a block diagram illustrating one example of a mobile device.

FIG. 1B illustrates a block diagram illustrating an example of a mobile device that operates in accordance with the techniques described herein. For purposes of example, the mobile device of FIG. 1B will be described with respect to mobile device 15 of FIG. 1A In this example, mobile device 15 includes various hardware components that provide core functionality for operation of the device. For example, mobile device 15 includes one or more programmable processors 70 configured to operate according to executable instructions (i.e., program code), typically stored in a computer-readable medium or data storage 68 such as static, random-access memory (SRAM) device or Flash memory device. I/O 76 may include one or more devices, such as a keyboard, camera button, power button, volume button, home button, back button, menu button, or presentation device 28 as described in FIG. 1A. Transmitter 72 and receiver 74 provide wireless communication with other devices, such as cloud server 12, computer system 14, or other mobile device 16 as described in FIG. 1A, via a wireless communication interface as described in FIG. 1A, such as but not limited to high-frequency radio frequency (RF) signals. Mobile device 15 may include additional discrete digital logic or analog circuitry not shown in FIG. 1B.

In general, operating system 64 executes on processor 70 and provides an operating environment for one or more user applications 77 (commonly referred to "apps"), including note management application 78. User applications 77 may, for example, comprise executable program code stored in computer-readable storage device (e.g., data storage 68) for execution by processor 70. As other examples, user applications 77 may comprise firmware or, in some examples, may be implemented in discrete logic.

In operation, mobile device 15 receives input image data and processes the input image data in accordance with the techniques described herein. For example, image capture device 18 may capture an input image of an environment having a plurality of notes, such as workspace 20 of FIG. 1A having of notes 22. As another example, mobile device 15 may receive image data from external sources, such as cloud server 15, computer system 14 or mobile device 16, via receiver 74. In general, mobile device 15 stores the image data in data storage 68 for access and processing by note management application 78 and/or other user applications 77.

As shown in FIG. 1B, user applications 77 may invoke kernel functions of operating system 64 to output a graphical user interface (GUI) 79 for presenting information to a user of mobile device. As further described below, note management application 78 may construct and control GUI 79 to provide an improved electronic environment for generating and manipulating corresponding digital notes representative of physical notes 22.

Figure 1C:
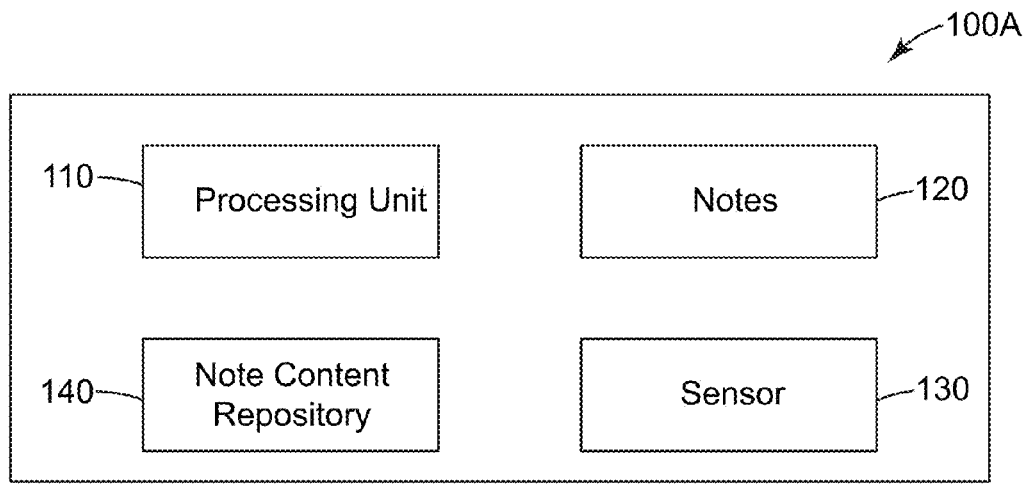
FIG. 1C illustrates an embodiment of a note recognition system.

To better understand the present disclosure, FIG. 1C illustrates an embodiment of a note recognition system 100A. The system 100A can include a processing unit 110, one or more notes 120, a sensor 130, and note content repository 140. The processing unit 110 can include one or more processors, microprocessors, computers, servers, and other computing devices. The sensor 130, for example, an image sensor, is configured to capture a visual representation of a scene having the one or more notes 120. The sensor 130 can include at least one of a camera, a video recorder, an infrared camera, a CCD (Charge Coupled Device) array, a scanner, or the like. The visual representation can include at least one of an image, a video, a sequence of images (i.e., multiple images taken within a time period and/or with a order), a collection of images, or the like. The processing unit 110 is coupled to the sensor 130 and configured to receive the visual representation. In some cases, the processing unit 110 is electronically couple to the sensor 130. The processing unit 110 is configured to recognize at least one of the one or more notes 120 from the visual representation. In some embodiments, the processing unit 110 is configured to recognize note(s) by determining the general boundary of the note(s). After a note is recognized, the processing unit 110 extracts the content of the note. In some cases, the processing unit 110 is configured to recognize and extract the content of more than one note from a visual representation of a scene having those notes.

In some cases, the processing unit 110 can execute software or firmware stored in non-transitory computer-readable medium to implement various processes (e.g., recognize notes, extract notes, etc.) for the system 100A. The note content repository 140 may run on a single computer, a server, a storage device, a cloud server, or the like. In some other cases, the note content repository 140 may run on a series of networked computers, servers, or devices. In some implementations, the note content repository 140 includes tiers of data storage devices including local, regional, and central. The notes 120 can include physical notes arranged orderly or randomly in a collaboration space and the sensor 130 generates a visual representation of the notes 120 in the collaboration space.

In some embodiments, at least some of the one or more notes 120 include a mark, which can facilitate the identification, recognition, and/or authentication of a note. In some embodiments, a mark includes at least one of a barcode, a color block, a color code, a fiduciary mark, a trademark logo, a dot, a hole, and the like. The shape and/or color of the note itself may be used as the mark to facilitate the identification, recognition, and/or authentication of a note. In some cases, the mark can include a plurality of elements arranged in certain patterns, for example, fiduciary marks at four corners of a rectangular note. In some other cases, the mark can include a plurality of elements, where at least some elements are non-visible elements that can be used to provide authentication information, for example, RFID (radio frequency identification) tags. By way of example, a mark can be made using at least one of a retroreflective material, an optically variable ink, a colored ink, infrared absorbing ink, fluorescent ink, watermark, glossy material, iridescent material, multi-layer optical film, colloidal crystals, perforated marks, structured color, floating image, window thread, or the like. In some embodiments, the processing unit 110 first recognizes the mark on a note from a visual representation, determines the location of the mark on the visual representation, and then extracts the content of the note based on the recognized mark. In some cases, the processing unit 110 extracts the content of the note based upon the recognized mark, a known shape of the note, and a known relative position of the mark on the note. In some implementations, the processing unit 110 extracts the content of the note from the visual representation in real-time (i.e., process the data in a transitory storage) without storing the visual representation in a non-transitory storage.

In some implementations, the note recognition system 100A can include a presentation device (not shown in FIG. 1C) to show to the user which notes are recognized and/or which notes' content have been extracted. Further, the note recognition system 100A can present the extracted content via the presentation device. In some embodiments, the processing unit 110 can authenticate a note before extracting the content of the note. If the note is authenticated, the content will be extracted and stored in the note content repository 140. In some cases, the processing unit can extract the authentication information from the mark on the note. In such cases, the authentication information can be visible or non-visible on the mark. For example, the mark on a note can include a symbol, for example, a company logo, a matrix code, a barcode, a color code, or the like. As another example, the mark on the note can include a tag to store information that can be retrieved by a suitable reader. For example, the mark can include a RFID tag, a near field communication (NFC) tag, or the like.

In some embodiments, the sensor 130 can generate a first visual representation of a scene having several notes 120, for example, taking a photograph or a video clip of the notes with the surrounding environment. Each of the notes has a mark. The processing unit 110 identifies the marks, determines the location of the marks, and uses the location of the marks to control the sensor 130 to generate a second visual representation of the scene having the notes 120, for example, taking a zoomed-in image of the notes. The processing unit 110 can further recognize and extract content of notes from the second visual representation.

Figure 1D:
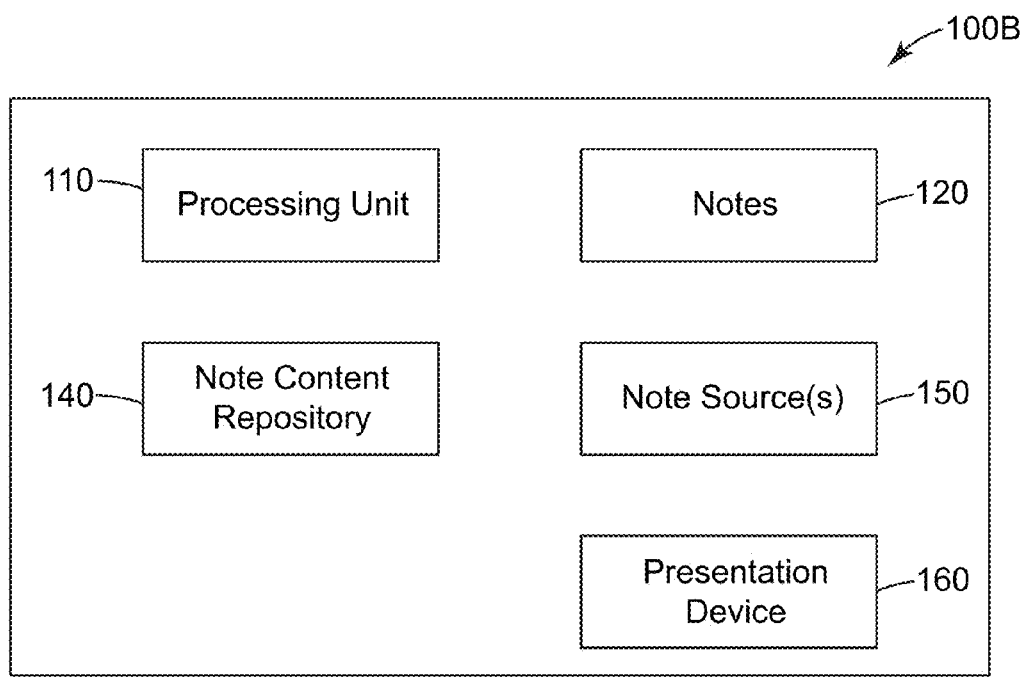
FIG. 1D illustrates an embodiment of a note management system.

FIG. 1D illustrates an embodiment of a note management system 100B. In this embodiment, the note management system 100B includes processing unit 110, one or more notes 120, one or more note sources 150, and a note content repository 140. In some cases, the system 100B includes a presentation device 160. The processing unit 110, the notes 120, and the note content repository 140 are similar to the components for the note recognition system 100A as illustrated in FIG. 1A. The note sources 150 can include sources to provide content of physical notes, such as a visual representation of a scene having one or more notes, and sources to provide content of digital notes, such as a data stream entered from a keyboard. In some embodiments, the note management system 100B includes a first source and a second source, and the first source is a visual representation of a scene having one or more notes 120. The first source and the second source are produced by different devices. The second source includes at least one of a text stream, an image, a video, a file, and a data entry. The processing unit 110 recognizes at least one of the notes from the first source and extracts the content of the note, as discussed in the note recognition system 100A. In some cases, the processing unit 110 labels the note with a category. The processing unit 110 can label a note based on its specific shape, color, content, and/or other information of the note. For example, each group of note can have a different color (e.g., red, green, yellow, etc.). In some cases, a note 120 can include mark that has one or more elements and the processing unit 110 can label the note based on information extracted from the mark.

In some embodiments, the note management system 100B can include one or more presentation devices 160 to show the content of the notes 120 to the user. The presentation device 160 can include, but not limited to, an electronically addressable display, such as a liquid crystal display (LCD), a tablet computer, a projector, an electronic billboard, a cellular phone, a laptop, or the like. In some implementations, the processing unit 110 generates the content to display on the presentation device 160 for the notes in a variety of formats, for example, a list, grouped in rows and/or column, a flow diagram, or the like.

Various components of the note recognition system and note management system, such as processing unit, image sensor, and note content repository, can communicate via a communication interface. The communication interface includes, but not limited to, any wired or wireless short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2A:
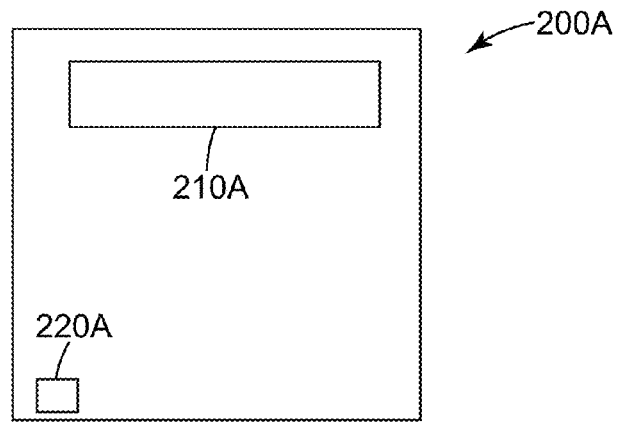
FIGS. 2A-2C illustrate some examples of notes having marks.
Figure 2B:
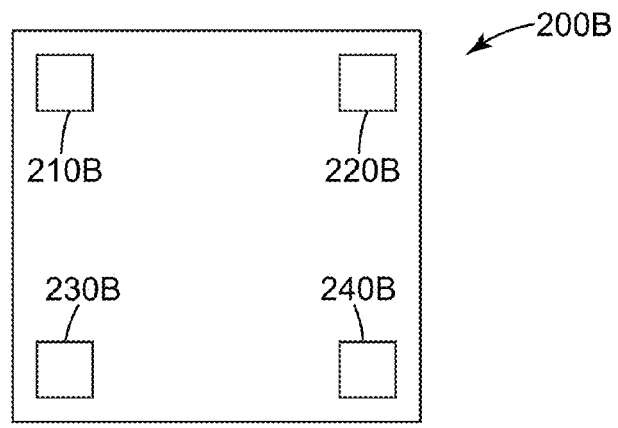
Figure 2C:
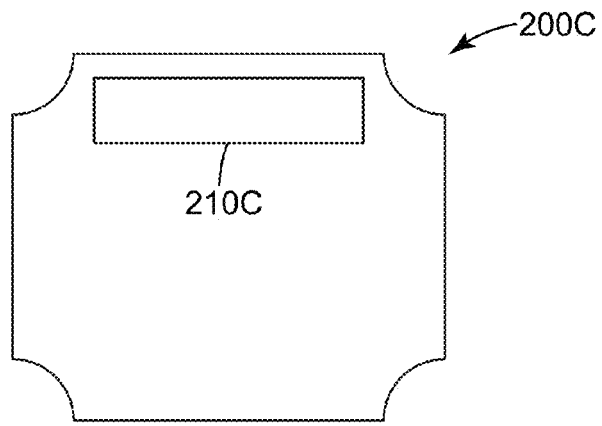

FIGS. 2A-2C illustrate some examples of notes having marks. As illustrated in FIG. 2A, the mark on the note 200A has two elements, element 210A and element 220A. The elements 210A and 220A can have different size, shape, relative position and/or material composition. For example, element 210A is a barcode as an identifier for the note and element 220A is a small rectangle of retro-reflective ink that can be used to determine the boundary of the note. As illustrated in FIG. 2B, the mark on the note 200B can have four elements 210B, 220B, 230B, and 240B. The four elements may have similar or different sizes, shapes, and material compositions. The mark can be used to recognize the size, location, orientation, distortion, and other characteristics of the note, which can be used in content extraction and enhancement. As illustrated in FIG. 2C, the mark on the note 200C has one element 210C. The note 200C has a non-rectangular shape. In some embodiments, the element 210C includes an identifier, for example, to identify the types and the grouping for a note. In some cases, the identifier is a unique identifier.

Figure 3A:
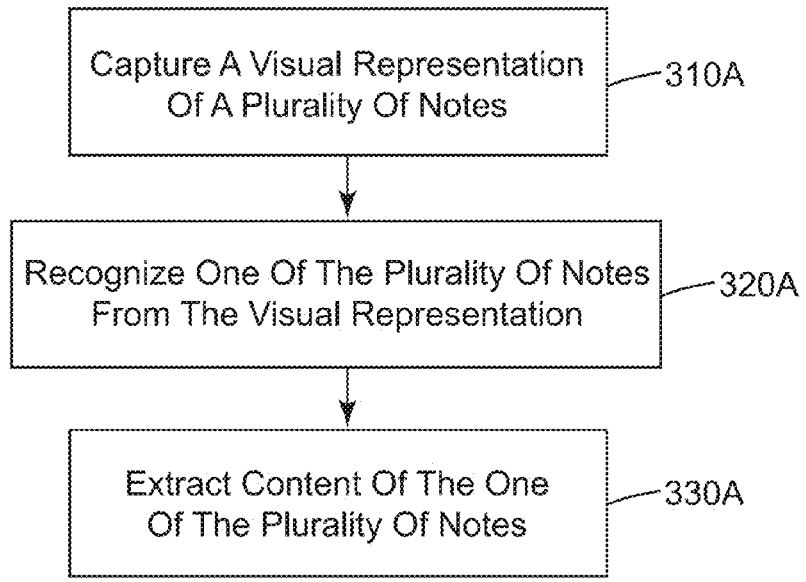
FIG. 3A illustrates a flow diagram of an embodiment of a note recognition and/or management system.

FIG. 3A illustrates a flow diagram of an embodiment of a note recognition and/or management system. Initially, the system captures a visual representation of plurality of notes (step 310A). In some embodiments, the notes are physical notes and it is more efficient to capture more than one note at a time. Next, the system recognizes one of the plurality of notes from the visual representation (step 320A). For example, the system can recognize a specific mark on a note and subsequently determine the general boundary of the note. The system extracts content of the one of the plurality of notes (step 330A). In some embodiments, the system can apply image transformation to at least part of the visual representation before extracting content. In some other embodiments, the system can apply image enhancement or other image processing technique to improve the quality of the extracted content. In yet other embodiments, the system can further recognize text and figures from the extracted content.

Figure 3B:
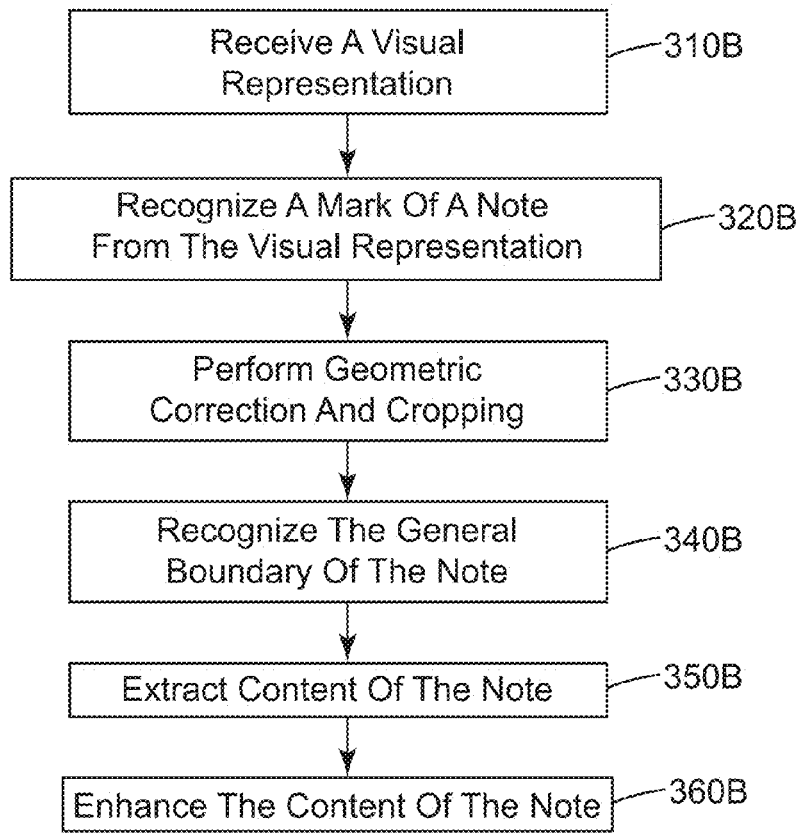
FIG. 3B illustrates a flow diagram of an embodiment of extracting content of notes.

FIG. 3B illustrates a flow diagram of an embodiment of extracting content of notes. First, a visual representation is received by the system (step 310B). The system recognizes a mark on a note from the visual representation (step 320B). After the position and/or shape of the mark is determined, the system may optionally perform geometric correction and cropping to the visual representation (step 330B). Based on the recognized position and/or shape of the mark on the note, the general boundary of the note is recognized on the visual presentation (step 340B). In some embodiments, the system may receive two visual representations of the same set of notes, where each of the notes has a mark. The first visual representation is taken using a light source suitable to capture the marks on the notes. For example, the light source can be infrared light for marks using infrared sensitive ink. The marks are recognized in the first visual representation and the positions of the marks are determined. The second visual representation can capture the set of notes and the system can determine the general boundary of each note based on its mark respectively. After the general boundary of a note is determined, the system extracts the content of the note (step 350B). For example, where the visual representation is an image, the system may crop the image according to the determined general boundary of the note. Optionally, the system may enhance the content of the note (step 360B), for example, by changing the contrast, brightness, and/or using other image processing techniques. In some cases, the system may update the note with a status indicating its content extracted.

Figure 3C:
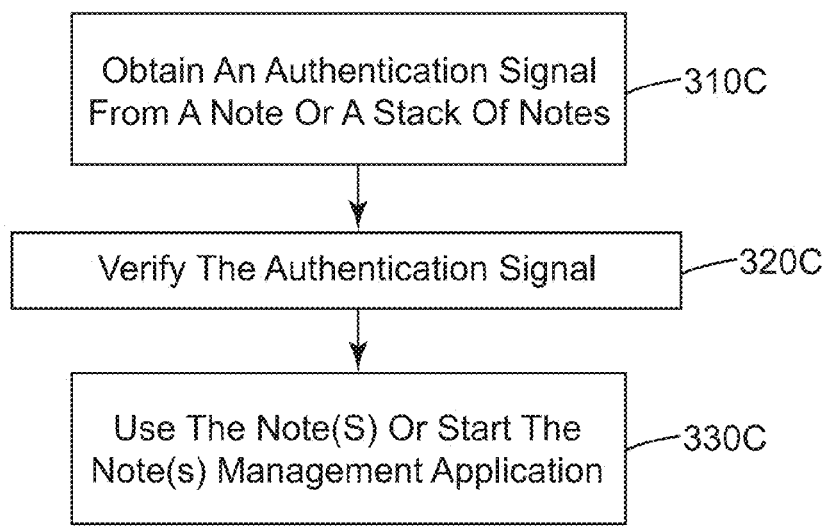
FIG. 3C illustrates a flow diagram of an embodiment of authenticating a note.

FIG. 3C illustrates a flow diagram of an embodiment of authenticating a note. First, obtain an authentication signal from a note or a stack of notes (step 310C). In one embodiment, the authentication information is a visual component (e.g., a hologram) of a mark on a note and the authentication signal can be obtained by extracting the visual component from a visual representation capturing the note. In another embodiment, the authentication information is contained in an electronic component (e.g., a RFID tag) of a mark on a note and the authentication signal can be obtained using a suitable reader (e.g., a RFID reader). Next, the system verifies the authentication signal (step 320C). The system can start the note management application or use the note(s) if the note(s) are authenticated (step 330C).

Figure 4A:
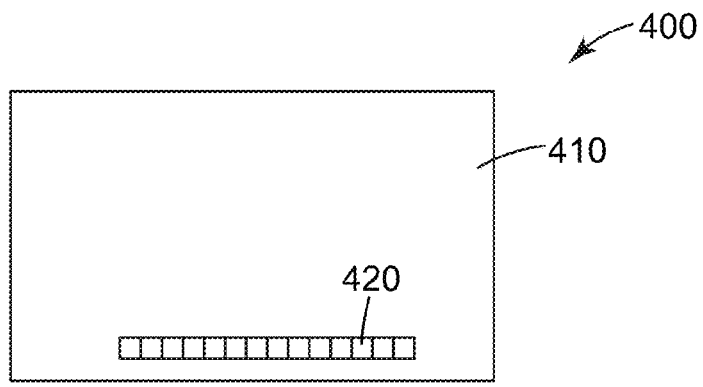
FIGS. 4A-4D illustrate an example of content extraction process of a note with a mark.
Figure 4B:
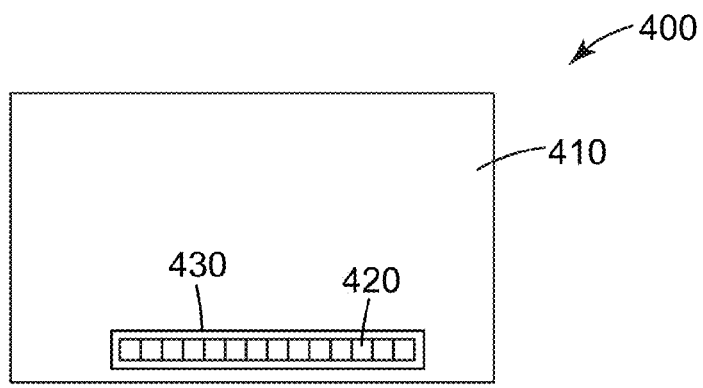
Figure 4C:
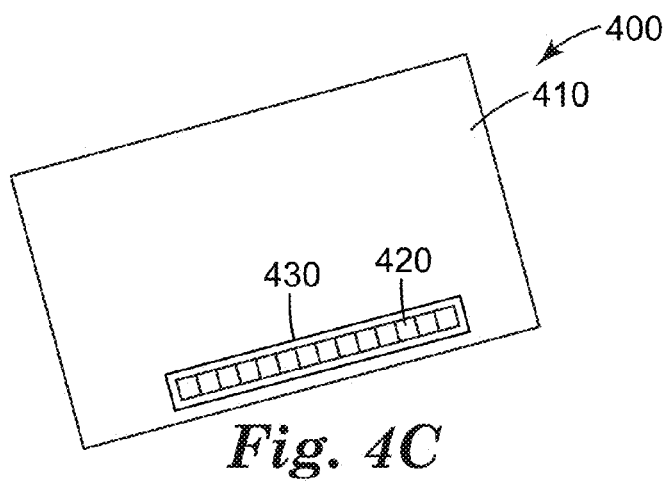
Figure 4D:
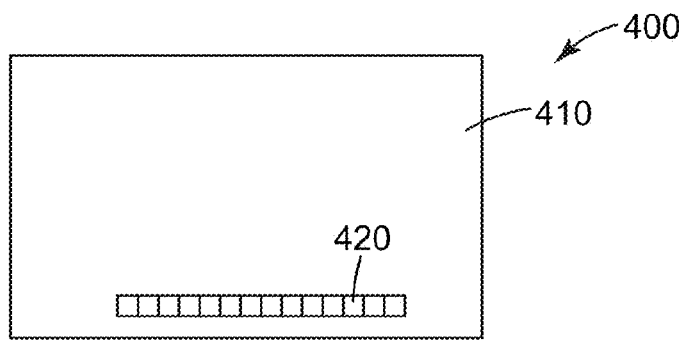

FIGS. 4A-4D illustrate an example of content extraction process of a note with a mark. First, as illustrated in FIG. 4A, a visual representation 400 of a note 410 is captured. The note 410 has a mark 420, which can be a barcode, a color code, a matrix code, a color block, or the like. Next, as illustrated in FIG. 4B, the system determines the general boundary 430 of the mark on the visual representation and recognizes the mark 420. In some cases, the note 410 may be slanted in the visual representation 400, as illustrated in FIG. 4C. In some other cases, the visual representation 400 may be taken with geometric distortion. The system may use the determined general boundary of the mark 420 or a portion of the mark 420 to determine the necessary image transformation and correction to the visual representation 400 to obtain the note content. FIG. 4D illustrates that the system extracts the content of the note 410 after the previous analysis and/or image processing.

Figure 5A:
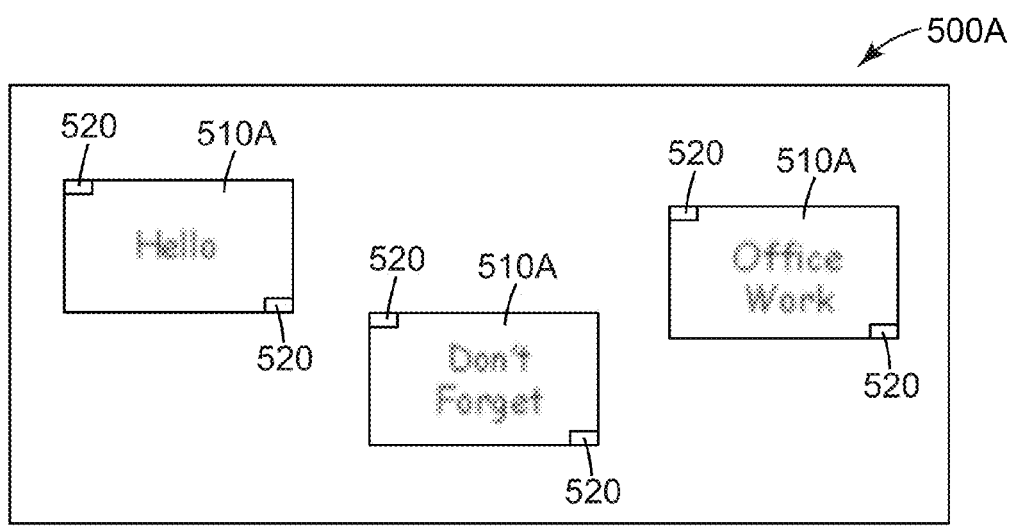
FIGS. 5A-5D illustrate an embodiment of content extraction of a plurality of notes with retroreflective marks.
Figure 5B:
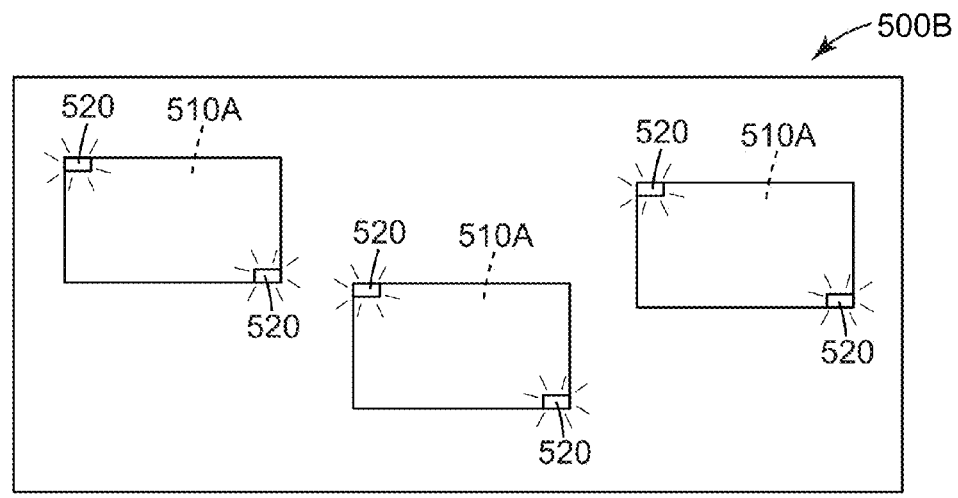
Figure 5C:
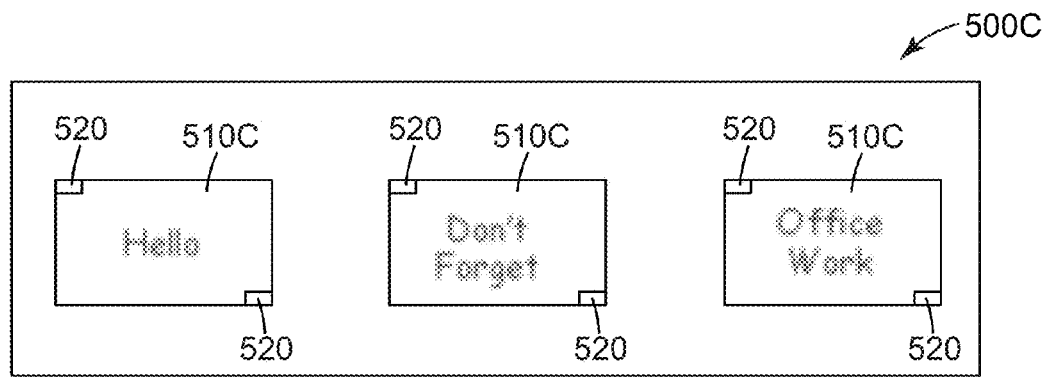
Figure 5D:
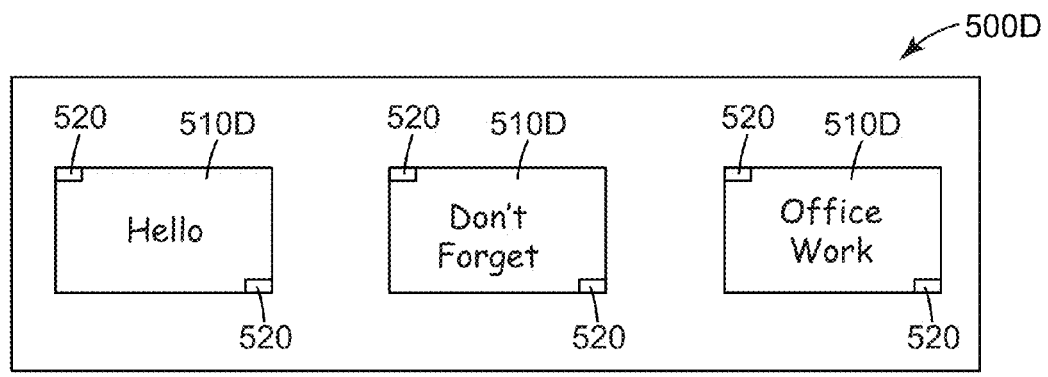

FIGS. 5A-5D illustrate an embodiment of content extraction of a plurality of notes with retroreflective marks. A note recognition/management system receives a visual representation 500A, which captures three notes 510A, and each note 510A has a mark 520 has two elements—two retroreflective rectangular tags at upper left and lower bottom corners. Because of the optical property of the retroreflective material, the mark 520 is substantially brighter than the rest of the note. FIG. 5B illustrates the marks 520 are much brighter than the notes 510A and the background. In some embodiments, the system may use image processing to transform the visual representation of 500A as illustrated in FIG. 5A to 500B as illustrated in FIG. 5B. In some alternative embodiments, the system may generate another visual representation 500B of the three notes 510A with a different light source, for example, a flash light. The system can easily identify the marks 520 from the visual representation 500B. After the marks 520 are identified, the system can extract the content of the notes 510C, as illustrated in FIG. 5C. In some cases, the system may use image processing technique (e.g., adaptive histogram equalization) to enhance the extracted content 510D, as illustrated in FIG. 5D.

Figure 6:
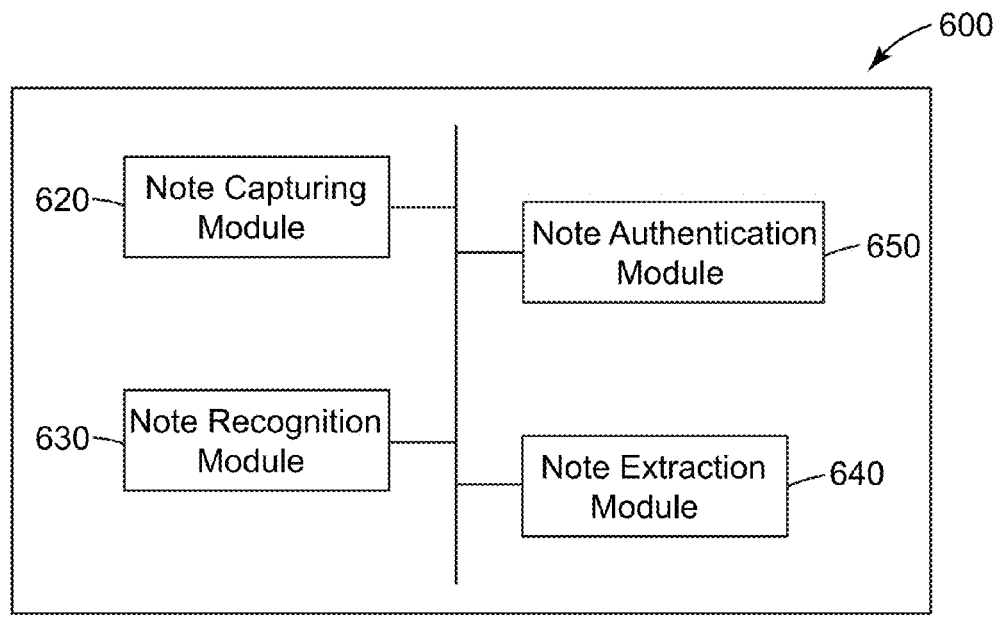
FIG. 6 illustrates a module diagram of an embodiment of a note recognition system.

FIG. 6 illustrates a module diagram of an embodiment of a note recognition system 600. In the embodiment as illustrated, the system 600 includes a note capturing module 620, a note recognition module 630, and a note extraction module 640. Various components of the note recognition system 600 can be implemented by one or more computing devices, including but not limited to, circuits, a computer, a processor, a processing unit, a microprocessor, and/or a tablet computer. In some cases, various components of the note recognition system 600 can be implemented on a shared computing device. Alternatively, a component of the system 600 can be implemented on multiple computing devices. In some implementations, various modules and components of the system 600 can be implemented as software, hardware, firmware, or a combination thereof. In some cases, various components of the note recognition system 600 can be implemented in software or firmware executed by a computing device. Additionally, various components of the system 600 can communicate via or be coupled to via a communication interface, for example, a wired or wireless interface. The note capturing module 620 is configured to capture a visual representation of a plurality of physical notes. In some embodiments, the note capturing module 620 includes an image sensor. The note recognition module 630 is coupled to the note capturing module 620, the note recognition module is configured to receive the captured visual representation and determine a general boundary of one of the plurality of physical notes from the captured visual representation. In some cases, the note recognition module 630 is configured to create a digital note representative the recognized physical note. The note extraction module 640 is configured to extract content of the one of the plurality of notes from the captured visual representation based on the determined general boundary of the one of the plurality of notes. In some cases, the note extraction module 640 is configured to associate the extracted content with the corresponding digital note.

In some embodiments, the note recognition system 600 includes a note authentication module 650 configured to authenticate the plurality of notes. In some cases, at least some of the plurality of notes have a mark. The mark can be used to facilitate the recognition, extraction and authentication of the note. For example, the note authentication module 650 can obtain an authentication signal from a mark of a note and verify the authentication based on the authentication signal. In some cases, the note authentication module 650 is coupled to the note recognition module 630 and provides the authentication information to the note recognition module 630. In some embodiments, the note recognition module 630 and the note extraction module 640 can perform the steps illustrated in FIG. 3B and in the relevant discussions.

In some embodiments, a note recognition/management system may use multiple recognition algorithms to recognize notes and extract notes' content, such as color recognition, shape recognition, and pattern recognition. For example, the system may use color spaces such as the RGB, HSV, CIELAB, etc. to identify regions of interest corresponding to the notes for color recognition. In some cases, the notes are further distinguished in their shape and due to the presence of unique patterns detected by shape recognition (e.g., Hough transform, shape context, etc.) and pattern recognition algorithms (e.g., Support Vector Machine, cross-correlation, template matching, etc.) respectively. These algorithms help filter out unwanted objects in the visual representation or other sources of notes' content and leave only those regions of interest corresponding to the notes.

In an embodiment, a note may include a mark made using fluorescent materials, such as printable inks or coatable dyes. For example, a fiducial mark such as a logo can be printed in fluorescent ink on the writing surface of a note. An appropriate light source would excite the fluorescent material. For example, a white LED (light emitting diode) of a mobile handheld device may be able to excite the fluorophore using the significant blue wavelength component of the LED output spectrum. In one embodiment, a fluorescent dye can be coated on the writing surface of the notes or included in the materials making the notes. In this embodiment, the fluorescent dye can provide not only verification of a branded product but can also improve the contrast between the written information on the note and the background of the note itself. Such mark can facilitate the recognition and segmentation of notes on a visual representation produced by an image sensor. In the cases of notes made from paper with fluorescent dye, the captured visual representation may have better readability. Depending on the excitation wavelength range and the fluorescing wavelength range for the fluorescent materials, additional optical equipment, such as a filter, may be used together with an image sensor (e.g., a camera) to improve detection.

Figure 7A:
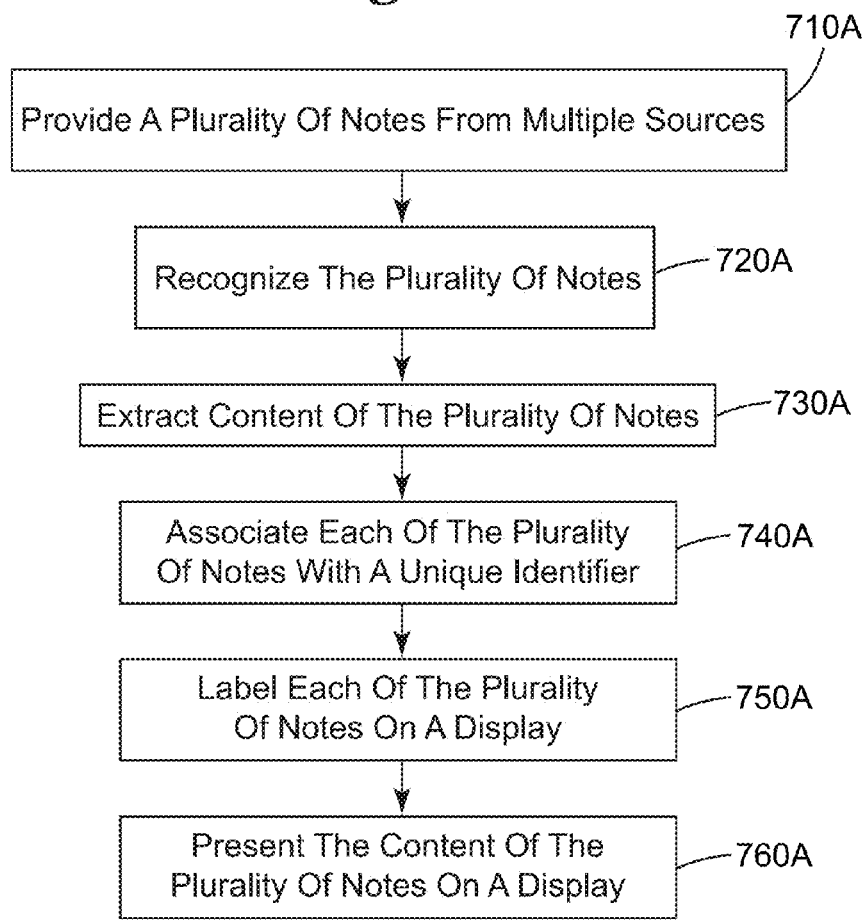
FIG. 7A illustrates a flow diagram of an embodiment of a note management system.

FIG. 7A illustrates a flow diagram of an embodiment of a note management system. First, the system receives a plurality of notes from multiple sources (step 710A). For example, the note management system may receive a set of images of a number of notes from a camera or a smart phone and receive another set of images of a number of notes taken from a remote location. As another example, the note management system may receive a visual representation (e.g., a video) of a number of notes taken by a video recording device and a text stream of notes that is entered via a laptop. In some embodiments, the multiple sources are sources of notes' content taken from different devices, for example, cameras, scanners, computers, etc. Then, the system recognizes one of the plurality of notes (step 720A). In some cases, the system creates digital notes representative of the one of the plurality of physical notes, The system extracts content of the plurality of notes (step 730A). In some cases, the system associates the extracted content with the corresponding digital notes representative of physical notes. In some embodiments, some notes include marks (e.g., color block, color code, barcode, etc.) on the note and one source of notes is a visual representation of some of the notes. In some cases, the recognizing step includes recognizing marks on the notes from the visual representation and then determines the general boundaries of the notes based on the recognized marks. In some of these cases, the extracting step includes extracting the content based upon the recognized marks, known shapes of the notes, and known relative positions of the marks on the notes. After the content of the plurality of notes is extracted, in some cases, the system may associate each of the plurality of digital notes with a unique identifier (step 740A). The system may label each of the plurality of digital notes with a category (step 750A). The labeling step is discussed in more details below. Additionally, the system may first authenticate the notes before recognizing the notes. Optionally, the system may present the content of the plurality of notes on a display (step 760A). In some embodiments, the system may present the extracted content of the plurality of notes with an output field indicating the categories of the notes. In some implementations, the system may use the category information of the digital notes in presenting the digital notes (e.g., show the notes in one category in a group).

Figure 7B:
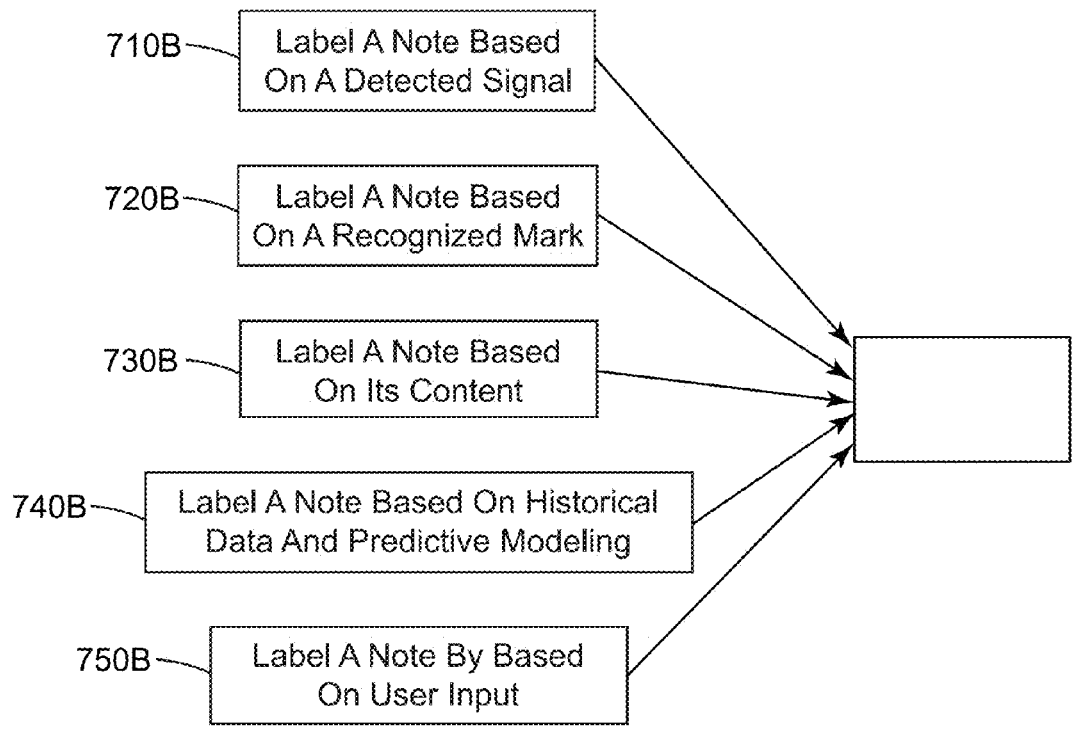
FIG. 7B illustrates examples of how a system may label a note.

FIG. 7B illustrates examples of how a system may label a digital note. In one embodiment, a note management system can label a note based on a detected signal (710B). For example, a note can have a mark including a barcode; the system can read the barcode and label the note based on the barcode. In some cases, the system can label a note based on a recognized mark (720B). For example, the mark can include an icon, logo, or other graphical symbol indicating a particular group. The system may further label a note based on its content (730B). In some cases, the system may label a noted based on historical data and/or predictive modeling (740B). In some other cases, the system may label a note by user input (750B). A note management system can use one or more approaches to label a note. The system may also use other approaches to label a note that are not listed in FIG. 7B, for example, label a note based on the shape of the note. Further, in some cases, a note may be associated with more than one category.

Figure 8:
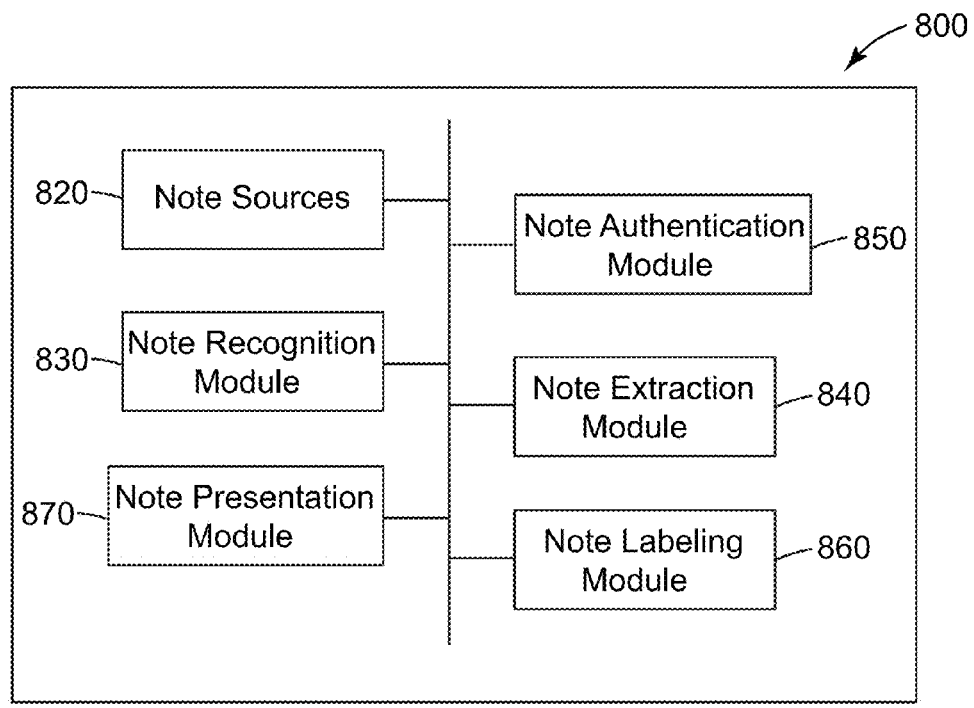
FIG. 8 illustrates a module diagram of an embodiment of a note management system.

FIG. 8 illustrates a module diagram of a note management system 800. In the embodiment as illustrated, the system 800 includes one or more note sources 820, a note recognition module 830, a note extraction module 840, and a note labeling module 860. Various components of the note management system 800 can be implemented by one or more computing devices, including but not limited to, circuits, a computer, a processor, a processing unit, a microprocessor, and/or a tablet computer. In some cases, various components of the note management system 800 can be implemented on a shared computing device. Alternatively, a component of the system 800 can be implemented on multiple computing devices. In some implementations, various modules and components of the system 800 can be implemented as software, hardware, firmware, or a combination thereof. In some cases, various components of the note management system 800 can be implemented in software or firmware executed by a computing device. Additionally, various components of the system 800 can communicate via or be coupled to via a communication interface, for example, a wired or wireless interface. The note source(s) 820 is configured to provide a plurality of notes. In some embodiments, one of the note sources 820 is a visual representation of a scene having one or more physical notes. In some cases, the note sources 820 include a plurality of different sources for providing notes, for example, images, text stream, video stream, or the like. The note recognition module 830 is coupled to the note sources 820, the note recognition module is configured to receive the visual representation, determine a general boundary of a physical note from the visual representation and create a digital note representative of the physical note. The note extraction module 840 is configured to extract content of the one of the plurality of physical notes from the visual representation based on the determined general boundary of the one of the plurality of physical notes and associate the extracted content with the corresponding digital notes. The note labeling module 860 is configured to label the one of the plurality of digital notes with a category.

In some embodiments, the note management system 800 includes a note authentication module 850 is configured to authenticate the plurality of notes. In some cases, at least some of the plurality of notes have a mark. The mark can be used to facilitate the recognition, extraction and authentication of the note. For example, the note authentication module 850 can obtain an authentication signal from a mark of a note and verify the authentication based on the authentication signal. In some cases, the note authentication module 850 is coupled to the note recognition module 830 and provides the authentication information to the note recognition module 830. In some embodiments, the note recognition module 830 and the note extraction module 840 can perform the steps illustrated in FIG. 3B and in the relevant discussions. In some embodiments, the note labeling module 860 can use one or more labeling approaches illustrated in FIG. 7B and in the relevant discussions. In some cases, a note may be associated with more than one category.

In some embodiments, the note management system 800 may include a note presentation module 870, which is configured to gather content of the plurality of digital notes and present at least part of the plurality of notes according to the category of the notes. For example, the note presentation module 870 can organize the plurality of digital notes into groups that have the same category. As another example, the note presentation module 870 can add connection lines and/or arrows of different groups of digital notes.

EXEMPLARY EMBODIMENTS

Embodiment 1

A method of collecting content of notes, comprising:
capturing, by a sensor, a visual representation of a scene having a plurality of physical notes, each of the physical notes having a predefined boundary and recognizable content thereon;
recognizing, by a processing unit, one of the plurality of physical notes from the visual representation; and
extracting, by the processing unit, the recognizable content of the one of the plurality of physical notes.

Embodiment 2

The method of Embodiment 1, wherein at least one of the plurality of physical notes comprises a mark.

Embodiment 3

The method of Embodiment 2, wherein the mark comprises at least one of a barcode, a color block, a color code, a pattern, a fiduciary mark, a trademark logo, a dot, and a hole.

Embodiment 4

The method of Embodiment 2, wherein the recognizing step comprises recognizing the mark of the one of the plurality of physical notes from the visual representation.

Embodiment 5

The method of Embodiment 4, wherein the recognizing step comprises recognizing the one of the plurality of physical notes based upon the recognized mark.

Embodiment 6

The method of Embodiment 4, wherein the recognizing step comprises determining the general boundary of the one of the plurality of physical notes based upon the recognized mark, a known shape of the one of the plurality of physical notes, and a known relative position of the mark on the one of the plurality of physical notes.

Embodiment 7

The method of Embodiment 2, wherein the mark comprises an identifier.

Embodiment 8

The method of Embodiment 7, wherein the identifier is a unique identifier.

Embodiment 9

The method of any one of Embodiment 1 through Embodiment 8, further comprising:
creating a digital note representative of the one of the plurality of physical notes; and
updating the digital note with a status indicating the recognizable content of the corresponding physical note being extracted.

Embodiment 10

The method of any one of Embodiment 1 through Embodiment 9, wherein the processing unit comprises at least one of a processor, a microprocessor, a microcontroller, a computer, and a computing device.

Embodiment 11

The method of any one of Embodiment 1 through Embodiment 10, further comprising:
presenting, by a presentation device, the extracted content to a user.

Embodiment 12

The method of any one of Embodiment 1 through Embodiment 11, wherein the mark is made using at least one of a retroreflective material, an optically variable ink, a colored ink, infrared absorbing ink, fluorescent ink, watermark, glossy material, iridescent material, perforated marks, structured color, floating image, and window thread.

Embodiment 13

The method of Embodiment 2, wherein the mark comprises a symbol.

Embodiment 14

The method of Embodiment 13, further comprising:
identifying the symbol from the visual representation.

Embodiment 15

The method of Embodiment 13, further comprising:
identifying the symbol by the processing unit,
authenticating, by the processing unit, the one of the plurality of physical notes based on the symbol,
wherein the extracting step comprises extract the content of the one of the plurality of physical notes if the one of the plurality of physical notes is authenticated.

Embodiment 16

The method of any one of Embodiment 1 through Embodiment 15, wherein the visual representation is an image or a video.

Embodiment 17

A note recognition system, comprising:
a sensor configured to capture an visual representation of a scene having a plurality of physical notes, each of the physical notes having a predefined boundary and recognizable content thereon,
a note recognition module coupled to the sensor, the note recognition module configured to receive the captured visual representation and determine a general boundary of one of the plurality of physical notes from the captured visual representation, and
a note extraction module configured to extract the recognizable content of the one of the plurality of physical notes from the captured visual representation based on the determined general boundary of the one of the plurality of physical notes.

Embodiment 18

The note recognition system of Embodiment 17, wherein at least one of the plurality of physical notes comprises a mark.

Embodiment 19

The note recognition system of Embodiment 18, wherein the mark comprises at least one of a barcode, a color block, a color code, a pattern, a fiduciary mark, a trademark logo, a dot, and a hole.

Embodiment 20

The note recognition system of Embodiment 18, wherein the note recognition module is further configured to recognize the mark of the one of the plurality of physical notes from the visual representation.

Embodiment 21

The note recognition system of Embodiment 20, wherein the note recognition module is further configured to recognize the one of the plurality of physical notes based upon the recognized mark.

Embodiment 22

The note recognition system of Embodiment 20, wherein the note recognition module is further configured to determine the general boundary of the one of the plurality of physical notes based upon the recognized mark, a known shape of the one of the plurality of physical notes, and a known relative position of the mark on the one of the plurality of physical notes.

Embodiment 23

The note recognition system of Embodiment 18, wherein the mark comprises an identifier.

Embodiment 24

The note recognition system of Embodiment 23, wherein the identifier is a unique identifier.

Embodiment 25

The note recognition system of any one of Embodiment 17 through Embodiment 24, wherein the note extraction module is further configured to create a digital note representative of the one of the plurality of physical notes and update the digital note with a status indicating the recognizable content of the corresponding physical notes being extracted.

Embodiment 26

The note recognition system of any one of Embodiment 17 through Embodiment 25, wherein the processing unit comprises at least one of a processor, a microprocessor, a microcontroller, a computer, and a computing device.

Embodiment 27

The note recognition system of any one of Embodiment 17 through Embodiment 26, further comprising:
  a note presentation module configured to present the extracted content to a user.

Embodiment 28

The note recognition system of any one of Embodiment 17 through Embodiment 27, wherein the mark is made using at least one of a retroreflective material, an optically variable ink, a colored ink, infrared absorbing ink, fluorescent ink, watermark, glossy material, iridescent material, perforated marks, structured color, floating image, and window thread.

Embodiment 29

The note recognition system of Embodiment 18, wherein the mark comprises a symbol.

Embodiment 30

The note recognition system of Embodiment 29, wherein the note recognition module is further configured to identify the symbol from the visual representation.

Embodiment 31

The note recognition system of Embodiment 29, further comprising:
  a note authentication module configured to authenticate notes,
  wherein the note recognition module is further configured to identifying the symbol,
  wherein the note authentication module is further configured to authenticate the one of the plurality of physical notes based on the symbol, and
  wherein the note extraction module is further configured to extract the recognizable content of the one of the plurality of physical notes if the one of the plurality of physical notes is authenticated.

Embodiment 32

The note recognition system of any one of Embodiment 17 through Embodiment 31, wherein the visual representation is an image or a video.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. A method of collecting content of notes, comprising:
  capturing, by a sensor of a computing device, a visual representation of a scene having a first physical note and a second physical note, each of the physical notes comprising a separate physical object having a predefined boundary and recognizable content thereon, the first physical note comprising a mark;
  processing, by a processing unit of the computing device, image data associated with the visual representation of the scene to identify the mark of the first physical note from the visual representation;
  identifying based at least in part on the identified mark, by the processing unit, a predefined boundary of the first physical note from the visual representation;
  extracting based at least in part on the predefined boundary of the first physical note, by the processing unit, first recognizable content from within the predefined boundary of the first physical note;
  associating the first recognizable content with a first digital note representative of the first physical note;
  identifying based at least in part on the identified mark, by the processing unit, a predefined boundary of the second physical note from the visual representation;
  extracting, by the processing unit, second recognizable content from within the predefined boundary of the second physical note;
  and associating the second recognizable content with a second digital note representative of the respective physical note.

2. The method of claim 1, wherein the identifying step comprises identifying the predefined boundary of the first physical note based upon the identified mark and a known shape of the first physical note.

3. The method of claim 1, wherein the identifying step comprises identifying the predefined boundary of the first physical note based upon the identified mark and a known relative position of the mark on the first physical note.

4. The method of claim 1, wherein the mark comprises at least one of a barcode, a color block, a color code, a color, a shape, a pattern, a fiduciary mark, a trademark logo, a dot, and a hole.

5. The method of claim 1, wherein the mark comprises a symbol.

6. The method of claim 5, further comprising:
  identifying the symbol by the processing unit; and
  authenticating, by the processing unit, based on the symbol.

7. The method of claim 1, wherein the computing device comprises a mobile computing device.

8. A note recognition device, comprising:
  a computing device,
  a sensor configured to capture a visual representation of a scene having a first physical note and a second physical note, each of the physical notes having a predefined boundary and recognizable content thereon, the first physical note comprising a mark, a note recognition module implemented on the computing device and coupled to the sensor, the note recognition module configured to process the captured visual representation, identify the mark of the first physical note from the captured visual representation, and identify, based at least in part on the identified mark, a predefined boundary of the first physical note from the visual representation, and a note extraction module implemented on the computing device and configured to extract first recognizable content of the first physical note from the captured visual representation from within the predefined boundary of the first physical note.

9. The note recognition device of claim 8, wherein the note recognition module is further configured to identify the predefined boundary of the first physical note based upon the identified mark and a known shape of the first physical note.

10. The note recognition device of claim 8, wherein the note recognition module is further configured to identify the predefined boundary of the first physical note based upon the identified mark and a known relative position of the mark on the first physical note.

11. The note recognition device of claim 8, wherein the mark comprises at least one of a barcode, a color block, a color code, a color, a shape, a pattern, a fiduciary mark, a trademark logo, a dot, and a hole.

12. The note recognition device of claim 7, wherein the mark comprises a symbol.

13. The note recognition device of claim 12, wherein the note recognition module is further configured to identify the symbol.

14. The note recognition device of claim 13, further comprising:

a note authentication module implemented on the computing device and configured to authenticate the first physical note based on the symbol.

15. The note recognition device of claim 14, wherein the note extraction module is further configured to extract the first recognizable content if the first physical note is authenticated.

16. The note recognition device of claim 8, wherein the note recognition device comprises a mobile computing device.

* * * * *